Patented Mar. 2, 1954

2,671,093

UNITED STATES PATENT OFFICE 2,671,093

STEROID COMPOUNDS

Frank H. Lincoln, Jr., and George B. Spero, Kalamazoo, Mich., assignors to The Upjohn Company, Kalamazoo, Mich., a corporation of Michigan No Drawing. Application February 14, 1952,
Serial No. 271,636

17 Claims. (Cl. 260—397.45)

The present invention relates to certain steroid compounds, and is more particularly concerned with certain 11α-oxygenated-3,17-dihydroxypregnane-20-ones and to a process for the production thereof.

This application is a continuation-in-part of our copending application Serial No. 267,198, filed January 18, 1952.

The novel compounds of the present invention may be represented by the formula:

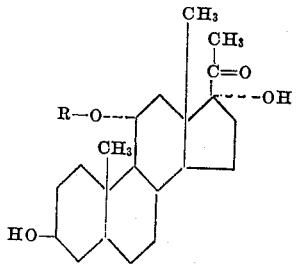

wherein R is selected from the group consisting of hydrogen and the acyl radical of an organic carboxylic acid, especially those containing from one to eight carbon atoms, inclusive. The configuration of the 3-hydroxy group in the above formula and elsewhere in this application includes both alpha and beta forms unless otherwise specified, and the configuration of the 17-hydroxy group in the above formula and elsewhere in this application is alpha.

It is an object of the present invention to provide a group of novel compounds, 11α-oxygenated-3,17 - dihydroxypregnane - 20 - ones, which have utility in the preparation of biologically-active compounds, such as cortisone and its derivatives, and which are also physiologically active per se. A further object of the invention is the provision of a process for the production of certain 11α-oxygenated-3,17-dihydroxypregnane-20-ones. Other objects of the invention will be apparent to those skilled in the art to which this invention pertains.

The compounds of the present invention, 11α-oxygenated-3,17-dihydroxypregnane-20-ones, are useful in the preparation of other steroid compounds having an oxygen atom at carbon atom eleven, such as cortisone acetate, which may be obtained from the compounds of the present invention by known methods, for example, by hydrolysis of the eleven-acyloxy group, if present, to an eleven-hydroxy group using acid or base, bromination with bromine in chloroform to introduce a bromine atom at the 21 position, oxidation of the three and eleven-hydroxy groups to ketone groups using chromic oxide, replacement of the 21-bromide by a 21-acetoxy group using potassium acetate in acetic acid, bromination with bromine in acetic acid to introduce a bromine atom at the four position, treatment with semicarbazide to introduce a double bond at the four position by removal of hydrogen bromide, the semicarbazone of the three-ketone group also being formed in this step, and hydrolysis of the semicarbazone with pyruvic acid to regenerate the three ketone. Such compounds are of particular interest in the field of steroid research due to the biological activity of the cortical hormones and certain known derivatives thereof. The importance of such investigation is moreover emphasized by the shortage of adrenal cortical hormones, and the absence of any present suggestion for the alleviation of said shortage except through organic synthesis.

The 11α-oxygenated-3,17-dihydroxypregnane-20-ones which are of particular interest are those compounds of the above generic formula wherein RO represents an eleven-hydroxy group and an ester of the eleven-hydroxy group with an organic carboxylic acid containing up to and including eight carbon atoms. Among such acids are formic, acetic, propionic, butyric, valeric, hexanoic, heptanoic, octanoic, cyclopentanoic, cyclopentylpropionic, benzoic, toluic, and the like. Preferred are those ester groups derived from the lower-aliphatic acids, especially those containing from one to eight carbon atoms, inclusive. The acids may also contain substituents, such as halo, alkyl, and methoxy, which are non-reactive under the reaction conditions employed. The eleven-ester group of an 11α-oxygenated-3,17-dihydroxypregnane-20-one is unchanged from the eleven-ester group present in the starting compound.

According to the process of the present invention, 11α-oxygenated-3,17-dihydroxypregnane-20-ones of the above structural formula are prepared from starting 17(20)-oxido-3,11α,20-triacyloxypregnanes, wherein the acyloxy groups have the formula AcO, Ac being the acyl radical of an organic carboxylic acid, especially those containing from one to eight carbon atoms, inclusive, by a reaction in which starting 17(20)-oxido-3,11α,20-triacyloxypregnanes, in solution in an organic solvent which is non-reactive under the conditions of the reaction, are treated with a saponifying agent, to produce the desired 11α-oxygenated-3,17-dihydroxypregnane-20-ones.

In carrying out the process of the present invention, a starting 17(20)-oxido-3,11α,20-triacyloxypregnane is dissolved in an organic solvent which is substantially non-reactive under the conditions of the reaction, such as methanol, ethanol, acetone, or dioxane, or benzene or toluene if a two-phase system is employed, or others, with ethanol being preferred. The resulting solution is then admixed with an aqueous solution of a saponifying agent, such as sodium or potassium hydroxide, sodium or potassium carbonate, sodium or potassium bicarbonate, or other basic saponifying agent, with sodium hydroxide being preferred. Use of an excess of the saponifying agent required completely to hydrolyze the starting 17(20)-oxido-3,11α,20-triacyloxypregnane, four to twenty gram equivalent weights, or even less or more, of the saponifying agent to one mole of the starting material, the preferred ratio being about ten to one, yields a 3,11α,17-trihydroxypregnane-20-one. Use of the exact amount, or even less, of the saponifying agent required completely to hydrolyze the starting 17(20)-oxido-3,11α,20-triacyloxypregnane gives products from which both a 3,11α,17-trihydroxypregnane-20-one and an 11α-acyloxy-3,17-dihydroxypregnane-20-one may be isolated. The order of admixing of the steroid solution and the aqueous solution of the saponifying agent is not significant, although ordinarily the aqueous saponifying solution is added to the starting steroid dissolved in an organic solvent. The resulting mixture is then permitted to stand for about fifteen minutes to about two hours, or even longer, the exact time depending in part upon the temperature, in part upon the starting 17(20)-oxido-3,11α,20-triacyloxypregnane employed, and in part upon whether complete or partial hydrolysis is desired. A longer time is generally preferred if complete hydrolysis is desired, and a shorter time is generally preferred if incomplete hydrolysis is desired. Temperatures between about zero and about 100 degrees, or even lower or higher, may be employed, room temperature being entirely satisfactory in most instances. In general a higher temperature gives a more rapid and more complete hydrolysis, and a lower temperature gives a slower and less complete hydrolysis. The reaction mixture may be agitated continuously, as, for example, by shaking with a rotary shaking device or other conventional stirring or agitation means. After completion of the desired reaction, the product may be isolated in any convenient manner, such as, for example, extraction with an organic solvent, such as chloroform, washing the extract with various solutions, such as aqueous sodium chloride, drying the washed extract with a drying agent, such as anhydrous sodium sulfate, removing the drying agent by filtration, and evaporating the organic solvent. The residue obtained after removal of the solvent may be purified, and separated into components if hydrolysis has been incomplete, by conventional procedures, such as chromatographic adsorption, fractional crystallization, or the like. Sometimes it is preferred not to purify the product since the residue obtained after removal of the washed and dried extraction solvent is of sufficient purity to be used in subsequent reactions.

The starting compounds, as mentioned above, are the 17(20)-oxido-3,11α,20-triacyloxypregnanes wherein each acyloxy group is an ester of a steroid hydroxy group with an organic carboxylic acid, especially such acids containing up to and including eight carbon atoms. Among such acids are formic, acetic, propionic, butyric, valeric, hexanoic, heptanoic, octanoic, cyclopentanoic, cyclopentylpropionic, benzoic, toluic, and the like. Preferred are those ester groups derived from the lower aliphatic acids, especially those containing from one to eight carbon atoms, inclusive. The acids may also contain substituents, such as halo, alkyl, and methoxy, which are non-reactive under the reaction conditions employed. The three, eleven, and twenty-ester groups may be the same, or two ester groups may be the same and one different, or all three ester groups may be different, depending on the precursors, since the ester groups of the 17(20)-oxido-3,11α,20-triacyloxypregnanes are unchanged from those in the precursors.

The starting 17(20)-oxido-3,11α,20-triacyloxypregnanes are prepared by an oxidation reaction in which an atom of oxygen is added to the 17(20)-ethylenic linkage in a 3,11α,20-triacyloxy-17(20)-pregnene. Any oxidant or epoxidizing agent capable of furnishing the necessary oxygen may be employed. The agents most commonly used are hydrogen peroxide and organic peracids, for example, peracetic, perpropionic, perbutyric, perbenzoic, or chloroperacetic. The reaction is carried out by mixing together the intermediate 3,11α,20-triacyloxy-17(20)-pregnene and the peracid of choice, preferably peracetic acid, or hydrogen peroxide for a suitable period, e. g., from about one-half to twenty-four hours, the length of time depending upon the concentration of oxygen-furnishing agent. When the oxidant is hydrogen peroxide, glacial acetic acid is a convenient reaction medium. When a peracid is employed, any of the customary organic solvents in which the starting steroid is soluble can be used, such as chloroform, carbon tetrachloride, ethylene dichloride, methylene chloride, mixtures of ether and chloroform, and others, with chloroform being preferred. It is sometimes desirable to add to the oxidizing medium a small quantity of an alkali-metal salt, such as, for example, sodium acetate. Temperatures between about zero and about 100 degrees centigrade can be conveniently used, with room temperature being entirely satisfactory in most cases. The starting 17(20)-oxido-3,11α,20-triacyloxypregnanes can then be isolated in any convenient manner, such as by volatilizing the reaction medium, extracting the residue with chloroform, volatilizing the chloroform, and crystallizing the residue from any organic solvent which is non-reactive with the oxide. It is sometimes preferred not to crystallize the product, since the residue obtained after removal of the solvent is of sufficient purity to be used in subsequent reactions.

The 3,11α,20-triacyloxy-17(20)-pregnenes used to prepare the starting 17(20)-oxido-3,11α,20-triacyloxypregnanes can be produced by various procedures. The 3α,11α,20-triacyloxy-17(20)-pregnenes are conveniently prepared by heating 3α,11α-dihydroxypregnane-20-one, a 11α-acyloxy-3α-hydroxypregnane-20-one, or a 3α,11α-diacyloxypregnane-20-one, all of which are prepared from progesterone as described below, with a large excess of an organic carboxylic acid anhydride in the presence of an acid catalyst such as sulfuric acid, sulfonic acids, or the like, with paratoluenesulfonic acid being preferred. The mixture is heated, usually at about 100 to 180 degrees centigrade, preferably at the boiling point, until the anhydride is nearly completely removed by distillation, which may require a period of about four hours. The rate of distillation may be faster or slower, and any period of about two hours to eight hours or even shorter or longer is operative. If the anhydride used has a high boiling point or is a solid, a suitable solvent such as toluene, xylene, paraffin hydrocarbons, or the like, may be used to control the temperature. The preferred anhydride is acetic anhydride, but other anhydrides, such as propionic, butyric, valeric, hexanoic, heptanoic, and octanoic, anhydrides, as well as benzoic acid anhydride, ortho-toluic acid anhydride, and the like are also operative. The acid anhydrides can also be substituted with non-reactive groups, such as halo, alkyl, and methoxy, as in the case of chloroacetic, orthotoluic, or methoxybenzoic acid anhydrides. Under the conditions of the reaction, hydroxyl groups at carbon atoms three and eleven will be acylated.

The 3α,11α-dihydroxypregnane-20-one, the 3α,11α-diacyloxypregnane-20-ones, and the 11α-acyloxy-3α-hydroxypregnane-20-ones are prepared from progesterone by the following reactions. Progesterone is oxidized to 11α-hydroxyprogesterone by a fermentation process more fully described in Preparation 1. The 11α-hydroxyprogesterone is reduced with hydrogen in ethanol using a palladium-charcoal catalyst to give 11α-hydroxypregnane-3,20-dione. Reduction of the 11α-hydroxypregnane-3,20-dione with sodium borohydride in dioxane gives the desired 3α,11α-dihydroxypregnane-20-one. Acylation of the 11α-hydroxypregnane-3,20-dione with an acylating agent, for example, an acid anhydride, such as acetic anhydride, to give an 11α-acyloxypregnane-3,20-dione, followed by reduction of the 11α-acyloxypregnane-3,20-dione with sodium borohydride in dioxane, gives the desired 11α-acyloxy-3α-hydroxypregnane-20-ones. Subsequent acylation of an 11α-acyloxy-3α-hydroxypregnane-20-one with an acylating agent, for example, an acid anhydride, such as acetic anhydride, produces the desired 3α,11α-diacyloxypregnane-20-ones.

3β,11α,20-triacyloxy-17(20)-pregnenes may be prepared from 11α-acyloxy-3β-hydroxypregnane-20-ones in the same manner as described above for the preparation of 3α,11α,20-triacyloxy-17(20)-pregnenes from 11α-acyloxy-3α-hydroxypregnane-20-ones. The 11α-acyloxy-3β-hydroxypregnane-20-ones are prepared by catalytic reduction of 11α-acyloxypregnane-3,20-diones, prepared from progesterone as described above, using hydrogen and a Raney nickel catalyst.

The following examples are illustrative of the process and products of the present invention, but are not to be construed as limiting.

PREPARATION 1.—11α-HYDROXYPROGESTERONE

A medium was prepared from five milliliters of corn steep liquor, twenty grams of Edamine commercial lactalbumin digest, and fifty milligrams of Cerelose commercial dextrose, per liter of tap water and adjusted to a pH of between about 5.5 and about 5.9. To four liters of this medium containing a 32 to 48 hour growth, at room temperature with aeration, of *Rhizopus arrhizus*, was added one gram of progesterone in fifty milliliters of acetone. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two per cent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature, whereupon 75 milligrams of crystals separated out. The mother liquor was freed of solvent by aeration, dissolved in fifty milliliters of benzene, and chromatographed over alumina ($Al_2O_3$). Fifty grams of acid-washed alumina, dried at 45 degrees centigrade, was used as adsorbent and 100-milliliter portions of solvents were used to develop the column. The solvents and the order used were as follows: benzene, benzene, benzene plus 5 per cent ether, benzene plus 5 per cent ether, benzene plus 10 per cent ether, benzene plus 10 per cent ether, benzene plus 10 per cent ether, benzene plus 50 per cent ether, benzene plus 50 per cent ether, ether, ether, ether plus 5 per cent chloroform, ether plus 5 per cent chloroform, ether plus 10 per cent chloroform, ether plus 10 per cent chloroform, ether plus 50 per cent chloroform, ether plus 50 per cent chloroform, chloroform, chloroform, chloroform plus 5 per cent acetone, chloroform plus 5 per cent acetone, chloroform plus 10 per cent acetone, chloroform plus 10 per cent acetone, chloroform plus 50 per cent acetone, chloroform plus 50 per cent acetone, acetone, acetone plus 5 per cent methanol, acetone plus 5 per cent methanol, acetone plus 10 per cent methanol, acetone plus 10 per cent methanol, acetone plus 50 per cent methanol, acetone plus 50 per cent methanol. The chloroform and chloroform plus five per cent acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade, was obtained. A sample recrystallized from methanol gave the following constants: melting point, 166–167 degrees centigrade; $[\alpha]_D^{20}$ plus 175.9 degrees (chloroform).

*Analysis.*—Per cent calculated for $C_{21}H_{30}O_3$: C, 76.4; H, 9.10. Found: C, 76.6; H, 8.92.

The structure of this product was further established by its conversion, with chromic acid in acetic acid, to 11-ketoprogesterone. [Reichstein, Helv. Chim. Acta, 23, 684 (1940); ibid 26, 721 (1943)].

PREPARATION 2.—11α-HYDROXYPREGNANE-3,20-DIONE

A solution of 250 milligrams of 11α-hydroxyprogesterone from Preparation 1 in 100 milliliters of ethanol containing six drops of triethylamine was subjected to hydrogenation at room temperature under a pressure of about ten pounds of hydrogen in the presence of 45 milligrams of a thirty per cent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145–185 degrees centigrade. This product was extracted with a mixture of one milliliter of ether and nine milliliters of Skelly Solve B. On standing, the extract deposited eighty milligrams (32 per cent) of 11α-hydroxypregnane-3,20-dione as feathery needles which melted at 85–90 degrees centigrade. Recrystallization from a mixture of about six drops of ethyl acetate and five milliliters of Skelly Solve B did not change the melting point.

Analysis.—Per cent calculated for $C_{21}H_{32}O_3$: C, 75.86; H, 9.70. Found: C, 76.13; H, 9.63.

PREPARATION 3.—3α,11α-DIHYDROXYPREGNANE-20-ONE

To a solution of 5.31 grams of 11α-hydroxypregnane-3,20-dione of Preparation 2 in 130 milliliters of peroxide-free dioxane maintained at fifty degrees centigrade in a water bath was added a solution of 195.5 milligrams of sodium borohydride (assay 84 per cent) in five milliliters of water. The mixture was stirred for one hour at fifty degrees centigrade, filtered, acidified with three normal aqueous hydrochloric acid solution, and evaporated under reduced pressure. The residue was crystallized from fifty milliliters of ethyl acetate to give 1.95 grams (36 per cent) of 3α,11α-dihydroxypregnane-20-one, which melted at 180–182 degrees centigrade. An additional 0.2 gram melting at 181–183 degrees centigrade was obtained from the filtrate, total yield, 2.15 grams (40 per cent).

PREPARATION 4.—11α-ACETOXYPREGNANE-3,20-DIONE

A mixture of 70.5 milligrams of 11α-hydroxypregnane-3,20-dione from Preparation 2, 0.8 milliliter of acetic anhydride, and 0.7 milliliter of pyridine was allowed to stand for sixteen hours at room temperature and then poured into ice water. The precipitated product was isolated by filtration and dried. The yield of 11α-acetoxypregnane-3,20-dione, melting at 143.5–146.5 degrees centigrade, was 67 milligrams (84 per cent). After one recrystallization from ether-Skelly Solve B, the melting point was 150–151 degrees centigrade; $[\alpha]_D^{23}$=plus 63 degrees ($c$=0.803 in chloroform).

Analysis.—Per cent calculated for $C_{23}H_{34}O_4$: C, 73.76; H, 9.15. Found: C, 73.93; H, 9.32.

PREPARATION 5.—11α-ACETOXY-3α-HYDROXYPREGNANE-20-ONE

To a solution of 200 milligrams (0.534 millimole) of 11α-acetoxypregnane-3,20-dione from Preparation 4 dissolved in ten milliliters of peroxide-free dioxane at fifty degrees centigrade was added dropwise with stirring a solution of 6.9 milligrams (0.152 millimole based on pure reagent) of sodium borohydride (assay 83.5 per cent) in one milliliter of water. The mixture was stirred at fifty degrees centigrade for one hour and acidified by pouring into fifty milliliters of water containing hydrochloric acid. The oil which first separated crystallized on standing. The solid was collected, washed with water, and dried under reduced pressure at fifty degrees centigrade. The yield of 11α-acetoxy-3α-hydroxypregnane-20-one, melting at 122–136 degrees centigrade, was 156 milligrams. The crude product was dissolved in fifteen milliliters of benzene and chromatographed over 7.5 grams of acid-washed alumina which had been dried at 120 degrees centigrade. The column was developed with two fifteen-milliliter portions of each of the following seventeen solvents: benzene, benzene and 5, 10 and 50 per cent ether, ether, ether and 5, 10, and 50 per cent chloroform, chloroform, chloroform and 5, 10, and 50 per cent acetone, acetone and 5, 10, and 50 per cent methanol, and methanol. The product appeared in fractions 12 (ether and 5 per cent chloroform) through 22 (chloroform and 10 per cent acetone). Combination of these fractions and recrystallization from ethyl acetate-Skelly Solve B gave 93 milligrams of product melting at 140–143 degrees centigrade. Two further recrystallizations from isopropyl ether gave pure 11α-acetoxy-3α-hydroxypregnane-20-one, melting at 146–148 degrees centigrade.

Analysis.—Per cent calculatde for $C_{23}H_{36}O_4$: C, 73.4; H, 9.64. Found: C, 73.8; H, 9.61.

PREPARATION 6.—3α,11α-DIACETOXYPREGNANE-20-ONE

Using the procedure described in Preparation 4, the 11α-acetoxy-3α-hydroxypregnane-20-one from Preparation 5 was esterified with acetic anhydride in pyridine to yield 3α,11α-diacetoxypregnane-20-one.

PREPARATION 7.—3α,11α,20-TRIACETOXY-17(20)-PREGNENE

Four hundred and five (405) milligrams of 3α,11α-dihydroxypregnane-20-one from Preparation 3, 200 milligrams of paratoluenesulfonic acid monohydrate and seventy milliliters of acetic anhydride were heated to distillation temperature and allowed to distil slowly for three and one-half hours. A total of sixty milliliters of distillate was collected. The residue was cooled to room temperature, poured into ice-water, and the resulting crystalline product collected and washed with water. Recrystallization from acetone-water yielded 332 milligrams of 3α,11α,20-triacetoxy-17(20)-pregnene, melting at 200–203 degrees centigrade.

PREPARATION 8.—3α,11α,20-TRIACETOXY-17(20)-PREGNENE

Using the same procedure as in Preparation 7, 1.0 gram of 3α,11α-diacetoxypregnane-20-one from Preparation 6 was treated with 0.45 gram of para-toluenesulfonic acid and 100 milliliters of acetic anhydride. The yield of 3α,11α,20-triacetoxy-17(20)-pregnene was 0.7 gram, melting at 200–210 degrees centigrade. A sample recrystallized for analysis from acetone-hexane and from alcohol melted at 211–213 degrees centigrade; $[\alpha]_D^{24}$ minus 16 degrees (chloroform).

Analysis.—Per cent calculated for $C_{27}H_{40}O_6$: C, 70.4; H, 8.75. Found: C, 70.5; H, 8.79.

PREPARATION 9.—3α,11α,20-TRIACETOXY-17(20)-PREGNENE

Using the same procedure as in Preparation 7, 2.42 grams of 11α-acetoxy-3α-hydroxypregnane-20-one from Preparation 5 was treated with 1.06 grams of para-toluenesulfonic acid and 240 milliliters of acetic anhydride. The yield of 3α,11α,20-triacetoxy-17(20)-pregnene, melting at 203-208 degrees centigrade, was 1.54 grams.

PREPARATION 10.—3α,11α,20-TRIPROPIONOXY-17(20)-PREGNENE

Using the procedure described in Preparation 7, 3α,11α-dihydroxypregnane-20-one from Preparation 3 is converted to 3α,11α,20-tripropionoxy-17(20)-pregnene with propionic anhydride in the presence of para-toluenesulfonic acid.

PREPARATION 11.—3α,11α-DIACETOXY-20-PROPIONOXY-17(20)-PREGNENE

Using the procedure described in Preparation 8, 3α,11α-diacetoxypregnane-20-one from Preparation 6 is converted to 3α,11α-diacetoxy-20-propionoxy-17(20)-pregnene with propionic anhydride in the presence of para-toluenesulfonic acid.

PREPARATION 12.—3β,11α,20-TRIACETOXY-17(20)-PREGNENE

Using the procedure described in Preparation 9, 3β-hydroxy-11α-acetoxypregnane-20-one (prepared by the reduction of the 11α-acetoxypregnane-3,20-dione of Preparation 4 with hydrogen at two to three atmospheres pressure in methanol at room temperature using a Raney nickel catalyst), is converted to 3β,11α,20-triacetoxy-17(20)-pregnene with acetic anhydride in the presence of para-toluenesulfonic acid.

In the same manner as given above, other 3α (or β),11α,20-triacyloxy-17(20)-pregnenes are prepared, including 3β,11α,20 - tripropionoxy - 17(20) - pregnene; 3β11α - diacetoxy-20-propionoxy-17(20)-pregnene; 3α,20-dipropionoxy-11α acetoxy - 17(20) - pregnene; 3β,11α,20 - trioctanoyloxy - 17(20)-pregnene; 3α,20-dioctanoyloxy-11α - propionoxy - 17(20) - pregnene; 3α - benzoyloxy - 11α - acetoxy - 20 - butyroyloxy - 17(20)-pregnene; 3α,11α-diacetoxy-20 - benzoyloxy-17(20) - pregnene; 3α,11α,20 - tributyroyloxy-17(20) - pregnene; 3α,11α,20 - trivaleroyloxy - 17A20) - pregnene; 3α,11α,20 - trihexanoyloxy - 17(20) - pregnene; 3α,11α,20 - triheptanoyloxy - 17(20)-pregnene; and 3α,11α,20-trioctanoyloxy-17(20)-pregnene.

PREPARATION 13.—17(20)-OXIDO-3α,11α,20-TRIACETOXYPREGNANE

One and one-half grams of 3α,11α,20-triacetoxy-17(20)-pregnene (from Preparation 7, 8 or 9) was dissolved in 7.5 milliliters of chloroform, and the solution was cooled in an ice bath to about five degrees centigrade. Three and three-tenths milliliters of commercial grade forty per cent peracetic acid solution in which 100 milligrams of sodium acetate had been dissolved was added, and the resulting mixture was then shaken on a mechanical shaking machine for about two hours at room temperature to complete the reaction. The mixture containing the crude product was diluted with fifty milliliters of methylene chloride and then washed with several 25-milliliter portions of ice-cold five per cent aqueous sodium hydroxide solution followed by 25-milliliter portions of water until the wash solution was neutral to pH test paper. The neutral solution was dried with anhydrous sodium sulfate and then filtered to remove the drying agent. The white crystalline residue obtained on evaporating the solvent from the clear, dry solution melted at 210-213 degrees centigrade. Recrystallization from a mixture of ethyl acetate and Skelly Solve B gave fluffy needles of 17(20)-oxido-3α,11α,20-triacetoxypregnane, melting at 214-217 degrees centigrade.

*Analysis.*—Per cent calculated for $C_{27}H_{40}O_7$: C, 68.04; H, 8.46. Found: C, 68.33; H, 8.62; C, 67.90; H, 8.38.

PREPARATION 14.—17(20)-OXIDO-3α,11α,20-TRIACETOXYPREGNANE

One gram of 3α,11α,20-triacetoxy-17(20)-pregnene (from Preparation 7, 8 or 9) was dissolved in fifteen milliliters of benzene and five milliliters of a two-molar solution of perbenzoic acid in benzene was added. After standing at room temperature for two hours to complete the reaction, the solution was diluted with thirty milliliters of benzene. The crude 17(20)-oxido-3α,11α,20-triacetoxypregnane, melting at 211-214 degrees centigrade, was obtained using the same procedure for isolation as in Preparation 13.

PREPARATION 15.—17(20)-OXIDO-3α,11α,20-TRIPROPIONOXYPREGNANE

Using the procedure described in Preparation 13, 3α,11α,20-tripropionoxy-17(20)-pregnene from Preparation 10 is converted to 17(20)-oxido-3α,11α,20 - tripropionoxypregnane by oxidation with peracetic acid in the presence of sodium acetate.

PREPARATION 16.—3α,11α-DIACETOXY-17(20)-OXIDO-20-PROPIONOXYPREGNANE

Using the procedure described in Preparation 14, 3α,11α-diacetoxy-20-propionoxy-17(20)-pregnene from Preparation 11 is converted to 3α,11α-diacetoxy - 17(20) - oxido - 20 - propionoxypregnane by oxidation with perbenzoic acid.

PREPARATION 17.—17(20)-OXIDO-3β,11α,20-TRIACETOXYPREGNANE

Using the procedure described in Preparation 13, 3β,11α,20-triacetoxy-17(20)-pregnene from Preparation 12 is converted to 17(20)-oxido-3β,11α,20-triacetoxypregnane by oxidation with peracetic acid in the presence of sodium acetate.

PREPARATION 18.—17(20)-OXIDO-3β,11α,20-TRIACETOXYPREGNANE

Using the procedure described in Preparation 14, 3β,11α,20-triacetoxy-17(20)-pregnene from Preparation 12 is converted to 17(20)-oxido-3β,11α,20-triacetoxypregnane by oxidation with perbenzoic acid.

In the same manner as given above in Preparation 13 through Preparation 18, other 17(20)-oxido-3α (or β),11α,20-triacyloxy pregnanes are prepared from the corresponding 3α (or β),11α,20-triacyloxy-17(20)-pregnenes, including 17(20) - oxido - 3β,11α,20 - tripropinoxypregnane; 3β,11α - diacetoxy - 17(20) - oxido - 20 - propionoxypregnane; 11α - acetoxy - 3α,20 - di - propionoxy-17(20)-oxidopregnane; 17(20)-oxido-3β,11α,20-trioctanoyloxypregnane; 3α,20-dioctanoyloxy - 17(20) - oxido - 11α - propionoxypregnane; 11α-acetoxy-3α-benzoyloxy-20-butyryloxy-17(20)-oxidopregnane; 20-benzoyloxy-3α,11α-diacetoxy - 17(20) - oxidopregnane; 17(20) - oxido-3α,11α,20-tributyryloxypregnane; 17(20)-oxido-3α,11α,20-trivaleryloxypregnane; 17(20)-oxido-3α,11α,20-trihexanoyloxypregnane; 17(20)-oxido - 3α,11α,20 - triheptanoyloxypregnane; 17(20) - oxido - 3α,11α,20 - trioctanoyloxypregnane; and the like.

Example 1.—11a-acetoxy-3a,17-dihydroxypregnane-20-one and 3a,11a,17-trihydroxypregnane-20-one

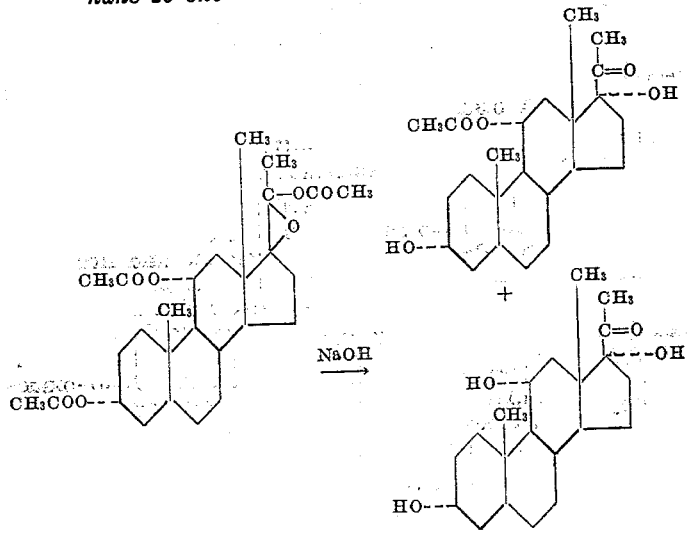

Nine hundred milligrams of 17(20)-oxido-3a,11a,20-triacetoxypregnane (from Preparation 13 or 14) was dissolved in fifty milliliters of alcohol, and to the resulting solution was added with swirling 11.3 milliliters of a 0.5 normal aqueous sodium hydroxide solution. After standing at room temperature for thirty minutes, the solution was extracted with chloroform, and the chloroform extract was then washed with twenty per cent aqueous sodium chloride solution and dried with anhydrous sodium sulfate. The drying agent was removed by filtration, and the solvent was removed by evaporation under reduced pressure giving the product as a colorless, viscous oil. The oil was dissolved in 100 milliliters of benzene, and the solution was passed through a chromatographic column packed with ninety grams of florisil synthetic magnesium silicate to adsorb the product. The product was eluted from the column by washing with the following solvent mixtures in succession: Ten 100-milliliter portions of 5 per cent acetone and 95 per cent Skelly Solve B, ten 100-milliliter portions of 10 per cent acetone and 90 per cent Skelly Solve B, and ten 100-milliliter portions of 20 per cent acetone and 80 per cent Skelly Solve B. On evaporation of the solvents from the various fractions, the product has been separated into two parts, both colorless viscous oils. The product from the first fraction was 11a-acetoxy-3a,17-dihydroxypregnane-20-one, as confirmed by analytical data, and the product from the later fractions was 3a,11a,17-trihydroxypregnane-20-one, identical with the 3a,11a,17-trihydroxypregnane-20-one obtained in Example 2. The ratio was about one part of the acetoxy compound for every nine parts of the trihydroxy compound.

Analysis of 11a-acetoxy-3a,17-dihydroxypregnane-20-one.—Per cent calculated for $C_{23}H_{36}O_5$: C, 70.37; H, 9.25. Found: C, 70.30; H, 9.30.

Example 2.—3a,11a,17-trihydroxypregnane-20-one

Six hundred and twenty milligrams of 17(20)-oxido-3a,11a,20-triacetoxypregnane (from Preparation 13 or 14) was dissolved in 55 milliliters of alcohol, and to the resulting solution was added in several portions with swirling 55 milliliters of a 0.5 normal aqueous sodium hydroxide solution. After standing at room temperature for fifty minutes, the solution was extracted with chloroform, and the chloroform extract washed with twenty per cent aqueous sodium chloride solution and dried with anhydrous sodium sulfate. The drying agent was removed by filtration, and the solvent was removed by evaporation under reduced pressure to give 490 milligrams of product as an oil. The oil was dissolved in ethyl acetate and Skelly Solve B was added. After standing for several hours the crystals which had formed were separated and recrystallized from an acetone-Skelly Solve B mixture to give 340 milligrams of 3a,11a,17-trihydroxypregnane-20-one; melting point, 184–186 degrees centigrade; $[\alpha]_D^{23}$ plus 52 degrees in acetone.

Analysis.—Per cent calculated for $C_{21}H_{34}O_4$: C, 71.96; H, 9.78. Found: C, 72.21; H, 9.53; C, 72.25; H, 9.66.

Example 3.—3a,11a,17-trihydroxypregnane-20-one

Using the procedure described in Example 2, an alcohol solution of 3a,11a-diacetoxy-17(20)-oxido-20-propionoxypregnane from Preparation 16 was converted to 3a,11a,17-trihydroxypregnane-20-one by treatment with an aqueous sodium hydroxide solution. This product was identical with the 3a,11a,17-trihydroxypregnane-20-one obtained as described in Example 2.

Example 4.—3a,17-dihydroxy-11a-propionoxypregnane-20-one and 3a,11a,17-trihydroxypregnane-20-one Using the procedure described in Example 1, an alcohol solution of 17(20)-oxido-3a,11a,20-tripropionoxypregnane from Preparation 15 was converted by treatment with an aqueous sodium hydroxide solution to an oily product which was separated into 3a,17-dihydroxy-11a-propionoxypregnane-20-one and 3a,11a,17-trihydroxypregnane-20-one. The ratio was about one part of the propionoxy compound for every seven parts of the trihydroxy compound.

Example 5.—11a-acetoxy-3β,17-dihydroxypregnane-20-one and 3β,11a,17-trihydroxypregnane-20-one Using the procedure described in Example 1, an alcohol solution of 17(20)-oxido-3β,11a,20-triacetoxypregnane (from Preparation 17 or 18) was converted by treatment with an aqueous sodium hydroxide solution to an oily product which was separated into 11α-acetoxy-3β,17-dihydroxypregnane-20-one and 3β,11α,17-trihydroxypregnane-20-one, as confirmed by analytical data. The ratio was about one part of the acetoxy compound for every ten parts of the trihydroxy compound.

*Analysis of 11α-acetoxy-3β,17-dihydroxypregnane-20-one.*—Per cent calculated for $C_{23}H_{36}O_5$: C, 70.37; H, 9.25. Found: C, 70.43; H, 9.19.

*Analysis of 3β,11α,17-trihydroxypregnane-20-one.*—Per cent calculated for $C_{21}H_{34}O_4$: C, 71.96; H, 9.78. Found: C, 71.80; H, 9.82.

*Example 6.—3β,11α,17-trihydroxypregnane-20-one*

Using the procedure described in Example 2, an alcohol solution of 17(20)-oxido-3β,11α,20-triacetoxypregnane (from Preparation 17 or 18) was converted to 3β,11α,17-trihydroxypregnane-20-one by treatment with an aqueous sodium hydroxide solution. This product was identical with the 3β,11α,17-trihydroxypregnane-20-one obtained as described in Example 5.

In the same manner as given above, other 11α-acyloxy-3α(or β),17-dihydroxypregnane-20-ones are prepared, including 3β,17-dihydroxy-11α-propionoxypregnane-20-one; 3β,17-dihydroxy-11α-octanoyloxypregnane-20-one; 11α-butyryloxy-3α,17-dihydroxypregnane-20-one; 3α,17-dihydroxy-11α-valeryloxypregnane-20-one; 3α,17-dihydroxy-11α-hexanoyloxypregnane-20-one; 3α,17-dihydroxy-11α-heptanoyloxypregnane-20-one; 3α,17-dihydroxy-11α-octanoyloxypregnane-20-one; and the like, depending on the starting material employed.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. An 11α-oxygenated-3,17-dihydroxypregnane-20-one of the formula:

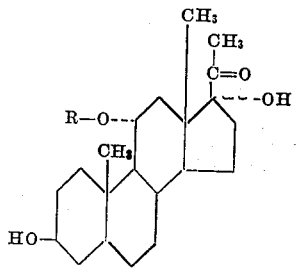

wherein R is selected from the group consisting of hydrogen and the acyl radical of a hydrocarbon carboxylic acid containing from one to eight carbon atoms, inclusive.

2. An 11α-acyloxy-3α,17-dihydroxypregnane-20-one, wherein the acyloxy group has the formula AcO, Ac being the acyl radical of a hydrocarbon carboxylic acid containing from one to eight carbon atoms, inclusive.

3. An 11α-acyloxy-3β,17-dihydroxypregnane-20-one, wherein the acyloxy group has the formula AcO, Ac being the acyl radical of a hydrocarbon carboxylic acid containing from one to eight carbon atoms, inclusive.

4. 11α-acetoxy-3α,17-dihydroxypregnane-20-one.

5. 3α,17-dihydroxy-11α-propionoxypregnane-20-one.

6. 11α-acetoxy-3β,17-dihydroxypregnane-20-one.

7. 3α,11α,17-trihydroxypregnane-20-one.

8. 3β,11α,17-trihydroxypregnane-20-one.

9. A process for the production of a mixture of 3,11α,17-trihydroxypregnane-20-one and 11α-acyloxy-3,17-dihydroxypregnane-20-one, which includes: treating (1) a 17(20)-oxido-3,11α,20-triacyloxypregnane, wherein the acyloxy groups have the formula AcO, Ac being the acyl radical of an hydrocarbon carboxylic acid containing from one to eight carbon atoms, inclusive, in solution in an organic solvent which is nonreactive under the conditions of the reaction, with (2) a saponifying agent, to produce the desired mixture.

10. A process for the production of an 11α-acyloxy-3α,17-dihydroxypregnane-20-one which includes: treating (1) a 17(20)-oxido-3α,11α,20-triacyloxypregnane, wherein the acyloxy groups have the formula AcO, Ac being the acyl radical of an hydrocarbon carboxylic acid containing from one to eight carbon atoms, inclusive, in solution in an organic solvent which is non-reactive under the conditions of the reaction, with (2) a solution of an alkali metal hydroxide in amount not more than the theoretical amount required completely to hydrolyze the starting 17-(20)-oxido-3α,11α,20-triacyloxypregnane, and (3) separating the thus-produced 11α-acyloxy-3α,17-dihydroxypregnane-20-one from the reaction product.

11. A process for the production of an 11α-acyloxy-3β,17-dihydroxypregnane-20-one which includes: treating (1) a 17(20)-oxido-3β,11α,20-triacyloxypregnane, wherein the acyloxy groups have the formula AcO, Ac being the acyl radical of an hydrocarbon carboxylic acid containing from one to eight carbon atoms, inclusive, in solution in an organic solvent which is non-reactive under the conditions of the reaction, with (2) a solution of an alkali metal hydroxide in amount not more than the theoretical amount required completely to hydrolyze the starting 17-(20)-oxido-3β,11α,20-triacyloxypregnane, and (3) separating the thus-produced 11α-acyloxy-3β,17-dihydroxypregnane-20-one from the reaction product.

12. A process for the production of 11α-acetoxy-3α,17-dihydroxypregnane-20-one which includes: treating (1) 17(20)-oxido-3α,11α,20-triacetoxypregnane, in solution in ethanol, with (2) a solution containing approximately the theoretical amount of sodium hydroxide for complete hydrolysis of the starting 17(20)-oxido-3α,11α,20-triacetoxypregnane and (3) separating the thus-produced 11α-acetoxy-3α,17-dihydroxypregnane-20-one from the reaction product.

13. A process for the production of 11α-propionoxy-3α,17-dihydroxypregnane-20-one which includes: treating (1) 17(20)-oxido-3α,11α,20-tripropionoxypregnane, in solution in ethanol, with (2) a solution containing approximately the theoretical amount of sodium hydroxide for complete hydrolysis of the starting 17(20)-oxido-3α,11α,20-tripropionoxypregnane and (3) separating the thus-produced 11α-propionoxy-3α,17-dihydroxypregnane-20-one from the reaction product.

14. A process for the production of 11α-acetoxy-3β,17-dihydroxypregnane-20-one which includes: treating (1) 17(20)-oxido-3β,11α,20-triacetoxypregnane, in solution in ethanol, with (2) a solution containing the theoretical amount of sodium hydroxide for complete hydrolysis of the starting 17(20)-oxido-3β,11α,20-triacetoxypregnane and (3) separating the thus-produced 11α-acetoxy-3β,17-dihydroxypregnane-20-one from the reaction product.

15. A process for the production of a mixture of 3,11α,17-trihydroxypregnane-20-one and 11α-acyloxy-3,17-dihydroxypregnane-20-one, which includes: (1) mixing together a 3,11α,20-triacyloxy-17(20)-pregnene, wherein the acyloxy groups have the formula AcO, Ac being the acyl radical of an hydrocarbon carboxylic acid containing from one to eight carbon atoms, inclusive, and an epoxidizing agent, to produce the corresponding 17(20)-oxido-3,11α,20-triacyloxypregnane, and (2) treating the 17(20)-oxido-3,11α,20-triacyloxypregnane obtained with a saponifying agent, to produce the desired mixture.

16. A process for the production of an 11α-acyloxy-3,17-dihydroxypregnane-20-one which includes: (1) mixing together, at a temperature between about zero and 100 degrees centigrade, a 3,11α,20-triacyloxy-17(20)-pregnene, wherein the acyloxy groups have the formula AcO, Ac being the acyl radical of an hydrocarbon carboxylic acid containing from one to eight carbon atoms, inclusive, and an organic peracid, to obtain the corresponding 17(20)-oxido-3,11α,20-triacyloxypregnane, and (2) treating the 17(20)-oxido-3,11α,20-triacyloxypregnane obtained with a saponifying agent, in amount not more than the theoretical amount required completely to hydrolyze the starting 17(20)-oxido-3,11α,20-triacyloxypregnane, and (3) separating the thus-produced 11α-acyloxy-3,17-dihydroxypregnane-20-one from the reaction product.

17. A process for the production of 11α-acetoxy-3α,17-dihydroxypregnane-20-one which includes: (1) mixing together, at a temperature between about zero degrees and 100 degrees centigrade, 3α,11α,20-triacetoxy-17(20)-pregnene with peracetic acid to produce 17(20)-oxido-3α,11α,20-triacetoxypregnane, and (2) treating the 17(20)-oxido-3α,11α,20-triacetoxypregnane obtained, in solution in an organic solvent, with a solution containing approximately the theoretical amount of sodium hydroxide for complete hydrolysis of the starting 17(20)-oxido-3α,11α,20-triacetoxypregnane, and (3) separating the thus-produced 11α-acetoxy-3α,17-dihydroxypregnane-20-one from the reaction product.

FRANK H. LINCOLN, JR.
GEORGE B. SPERO.

References Cited in the file of this patent
UNITED STATES PATENTS

| Number | Name | Date |
|---|---|---|
| 2,562,030 | Gallagher | July 24, 1951 |